(12) United States Patent
McMeekin (10) Patent No.: US 10,162,346 B1
(45) Date of Patent: Dec. 25, 2018

(54) METHOD AND APPARATUS FOR PROVIDING AUDIO MESSAGES FROM INDUSTRIAL EQUIPMENT

(71) Applicant: Michael McMeekin, Columbus, NE (US)

(72) Inventor: Michael McMeekin, Columbus, NE (US)

( * ) Notice: Subject to any disclaimer, the term of this patent is extended or adjusted under 35 U.S.C. 154(b) by 77 days.

(21) Appl. No.: 15/178,289

(22) Filed: Jun. 9, 2016

Related U.S. Application Data (60) Provisional application No. 62/173,018, filed on Jun. 9, 2015.

(51) Int. Cl.
*G06F 17/00* (2006.01)
*G05B 23/02* (2006.01)

(52) U.S. Cl.
CPC ....... *G05B 23/027* (2013.01); *G05B 23/0272* (2013.01); *G05B 2219/14096* (2013.01)

(58) Field of Classification Search
CPC .............. G05B 23/027; G05B 23/0272; G05B 2219/14096
See application file for complete search history.

(56) References Cited

U.S. PATENT DOCUMENTS

| | | |
|---|---|---|
| 4,330,780 A | 5/1982 | Masaki |
| 4,500,971 A | 2/1985 | Futaki |
| 5,245,694 A | 9/1993 | Zwera |
| 5,414,494 A | 5/1995 | Aikens et al. |
| 5,815,081 A | 9/1998 | Motohashi |
| 5,907,491 A | 5/1999 | Canada et al. |
| 6,246,325 B1 | 6/2001 | Chittipeddi |
| 6,487,375 B2 | 11/2002 | Ferrer et al. |
| 6,950,613 B2 | 9/2005 | Fujimoto et al. |
| 7,146,111 B2 | 12/2006 | Fujimoto et al. |
| 7,206,834 B1 * | 4/2007 | Barth .................. G05B 19/406 340/3.1 |
| 7,439,439 B2 | 10/2008 | Hayes et al. |
| 7,750,227 B2 | 7/2010 | Hayes et al. |
| 8,174,402 B2 | 5/2012 | Bouse et al. |
| 8,713,165 B2 | 4/2014 | Bharadwaj |
| 2006/0290971 A1 * | 12/2006 | McQuillan .............. G06F 3/121 358/1.15 |
| 2008/0059832 A1 | 3/2008 | Yamazaki et al. |
| 2012/0091988 A1 | 4/2012 | Barrett |
| 2012/0290886 A1 * | 11/2012 | Wilson, Jr. ............ G06F 11/079 714/57 |

(Continued)

FOREIGN PATENT DOCUMENTS

| | | |
|---|---|---|
| WO | 2013098619 A1 | 7/2013 |
| WO | 2013098619 A9 | 7/2013 |

*Primary Examiner* — Joseph Saunders, Jr.
(74) *Attorney, Agent, or Firm* — Suiter Swantz pc llo (57) ABSTRACT

A system for providing audible messages detailing machine issues in a manufacturing process when a manufacturing machine is not operating properly comprises a transmitter associated with each machine and one or more receivers. The transmitter communicates with the manufacturing machine to identify issues and transmits a corresponding message to specific receivers based on unit identifies and network addresses. The receiver includes a message storage element, an audio playback element, and selection controls to configure the radio frequency channel, the unit address, and the network address.

7 Claims, 4 Drawing Sheets

(56) References Cited

U.S. PATENT DOCUMENTS

2013/0201019 A1 8/2013 Yamaguchi et al.
2015/0364126 A1* 12/2015 Sun ................... G08B 25/012
 704/260

* cited by examiner

METHOD AND APPARATUS FOR PROVIDING AUDIO MESSAGES FROM INDUSTRIAL EQUIPMENT

PRIORITY

The present application claims the benefit under 35 U.S.C. § 119(e) of U.S. Provisional App. No. 62/173,018 (filed Jun. 9, 2015), which is incorporated herein by reference.

FIELD OF THE INVENTION

Embodiments of the inventive concepts disclosed herein are directed generally toward industrial equipment and more particularly accessories to industrial equipment to provide near real-time feedback.

BACKGROUND

Manufacturing companies utilize manufacturing equipment to produce products. Such equipment requires human operators to run and monitor the equipment. In many cases, human operators run and monitor multiple machines to minimize labor costs. In these situations, it is difficult for these human operators to quickly identify when and why a machine stopped, leading to extended downtimes. Existing machines provide information to the human operator in the form of video displays, stack lights, and audio alarms.

Video displays present readable information but human operators are not typically monitoring the displays at all times so there is a delay in reading the information. Stack lights provide an indication of machine mode; for example, Green indicating running, Yellow indicating waiting, and Red indicating down. Stack lights typically provide limited information concerning the reasons for any issues. Stack lights are not typically noticeable by the human operator unless they are looking directly at the stack lights. Audio alarms signal the human operator that the machine requires attention. Furthermore, responses to any machine issues are not immediate. While audio alarms provide a quick notice to the operator that the machine needs attention, it does not provide the reason for any issues.

Productivity of the machines is based on operational runtime: the more downtime, the less productive the machine. Most manufacturing production lines consist of multiple machines operating in series to form a production line. If one of the machines in the production line goes down, the whole production line is down. Furthermore, manufacturing is typically a noisy environment such that human operators require hearing protection, further hindering the usefulness of audio alarms.

Consequently, it would be advantageous if an apparatus existed that is suitable for identifying faults in a machine in a manufacturing process and remotely delivering details of the fault to a human operator in a timely fashion.

SUMMARY

In one aspect, embodiments of the inventive concepts disclosed herein are directed to identifying faults in a machine in a manufacturing process, filtering those faults according to a selected set of human operators, and remotely delivering audio representations of the fault to the set of human operator in a timely fashion.

In a further aspect, audio representations are stored in a plurality of languages such that the language actually received by a particular human operator or set of human operators is specific to the recipient.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for reducing manufacturing equipment downtime by facilitating detailed communication of machine faults to human operators and thereby improve productivity.

Figure 1:
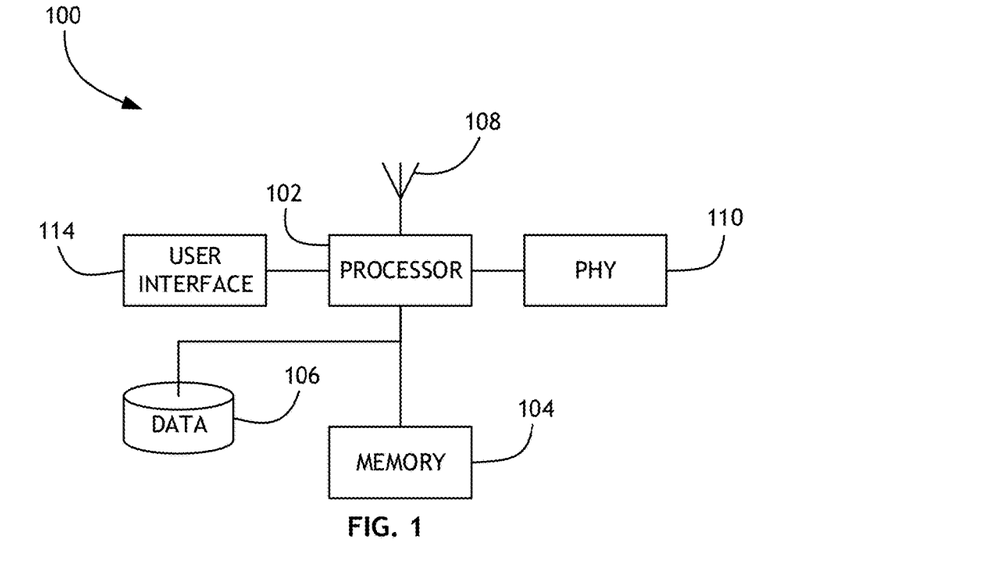
FIG. 1 shows a block diagram of an exemplary computer system for implementing embodiments of the inventive concepts disclosed herein; 1

Referring to FIG. 1, a block diagram of an exemplary computer system for implementing embodiments of the inventive concepts disclosed herein is shown. In some embodiments, the system 100 comprises a processor 102, memory 104 connected to the processor 102 for embodying processor executable code, a data transmission element 108 connected to the processor 102, and one or more physical connectors 110 connected to the processor 102 for integrating the system 100 with a machine in a manufacturing process via a machine controller as described herein. A person skilled in the art may appreciate that the processor 102 may comprise a general purpose processor configured by firmware; alternatively, the processor 102 may comprise a specialized hardware element. The data transmission element 108 may be a wireless data transmission element (such as an antenna) or a wired connector. Furthermore, both wired and wireless connections may be employed in the same device.

In some embodiments, the physical connector 110 comprises a universal serial bus (USB) port for power and data communication for uploading, downloading, or otherwise changing audio data. Said audio data may be encoded according to an appropriate audio codex, and be stored in any language to accommodate human operators for whom English is not the primary language.

Machines in a manufacturing process generally include some internal system status and fault detection logic. The system 100 integrates with that internal logic via the physical connector 108. The processor 102 receives status and fault messages from such physical connector 108. The processor 102 may filter the status and fault messages to identify messages to forward to a corresponding human operator via the data transmission element 108. In some embodiments, the processor 102 may deliver various subsets of messages to different receivers; for example, all messages may be delivered to a centralized process monitoring system while all fault messages are delivered to the human operator. Furthermore, critical fault messages may be delivered to a supervising human operator.

In some embodiments, the system 100 further comprises a data storage element 106 connected to the processor 102 for storing audio data. In some embodiments, the data storage element 106 may store audio messages associated with each potential fault message that might be delivered to the processor 102. When delivering messages to a human operator, the processor 102 may transmit corresponding audio data. Furthermore, the data storage element 106 may buffer a plurality of audio messages based on the order each audio message was received and initiate playback accordingly.

In some embodiments, the system 100 further comprises a user interface 114. The user interface 114 allows the processor 102 to be configured to send subsets of messages to different sets of receivers as more fully defined herein. The user interface 114 may comprise one or more channel switches to facilitate communication through a pre-defined set of available channels.

Figure 2:
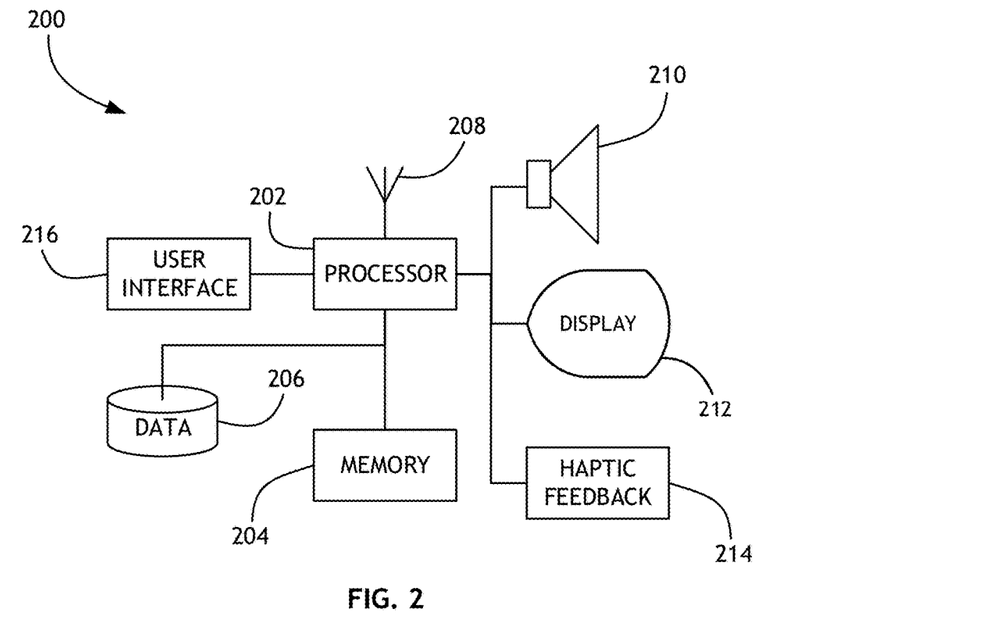
FIG. 2 shows a block diagram of an exemplary computer system for implementing embodiments of the inventive concepts disclosed herein; 2

Referring to FIG. 2, a block diagram of an exemplary computer system for implementing embodiments of the inventive concepts disclosed herein is shown. In some embodiments, the system 200 comprises a processor 202, memory 204 connected to the processor 202 for embodying processor executable code, a data receiving element 208 connected to the processor 202, and a speaker 210 connected to the processor 202 for delivering audio data to a human operator. In some embodiments, the speaker 210 may be embodied in noise cancelling headphones to enhance the audio data in a noisy manufacturing environment.

Where machines in a manufacturing process include components for sending status and fault messages, the system 200 receives those messages via the data receiving element 208. In some embodiments, where the messages include audio data corresponding to a description of the message, the processor 202 plays the audio data through the speaker 210 for the human operator. In some embodiments, the processor 202 filters the received messages based on some desired audio playback setting, provided that the received message is directed to a unit address corresponding to the system 200 and network address and the channel frequency of a data receiving element 208 matches or recognizes a transmitter network address and channel frequency.

In some embodiments, the processor 202 may determine playback of the audio data based on a selected subset of messages; for example, all messages may be received, but only audio data associated with fault messages are actually played.

Audio data may be stored in any language to accommodate human operators for whom English is not the primary language. Furthermore, audio data corresponding to similar fault identifiers may be stored in different languages in separate receiver systems 200 such that different human operators may easily comprehend the audio messages they receive.

In some embodiments, the system 200 further comprises a data storage element 206 connected to the processor 202 for storing audio data. In some embodiments, the data storage element 206 may store audio messages associated with each potential fault message that might be received by the processor 202; messages in such an embodiment may comprise only an identification code. Alternatively, the processor 200 may be configured to parse a text string corresponding to a message into individual words and play audio elements corresponding to each word without storing a complete audio version of the complete message.

In some embodiments, the system 200 further comprises a user interface 214. The user interface 214 allows the processor 202 to be configured to filter subsets of messages for audio playback. The user interface 214 may comprise one or more channel switches to facilitate communication through a pre-defined set of available channels. The user interface 214 may comprise a unit select component to allow the operator to select a plurality of different unit addresses of the device to identify the type of audio messages to be played. For example, the unit select component may designate messages for electrical technicians, mechanical technicians, engineers, etc. Furthermore, a unit select component may be used to select from different stored languages.

In some embodiments, the system 200 further comprises a display element 212. Text associated with messages received by the processor 202 may be displayed on the display element 212 to provide a less transitory version of the message and allow a human operator to immediately see details contained in the message. In some embodiments, the display element 212 may be combined with the user interface 216 in the form of a touch sensitive film for selecting messages in a list of received messages.

In some embodiments, the system 200 further comprises a haptic feedback element 214 for providing a tactile sensation when a message is received, in addition to the auditory playback, or instead of the auditory playback if the message is of a type selected for removal by filtering, or if no audio data is associated with the specific message.

In some embodiments, the processor 200 is configured to monitor available power. When a low threshold of available power is identified, the processor 200 initiates a stored audio message indicating a low power state.

Figure 3:
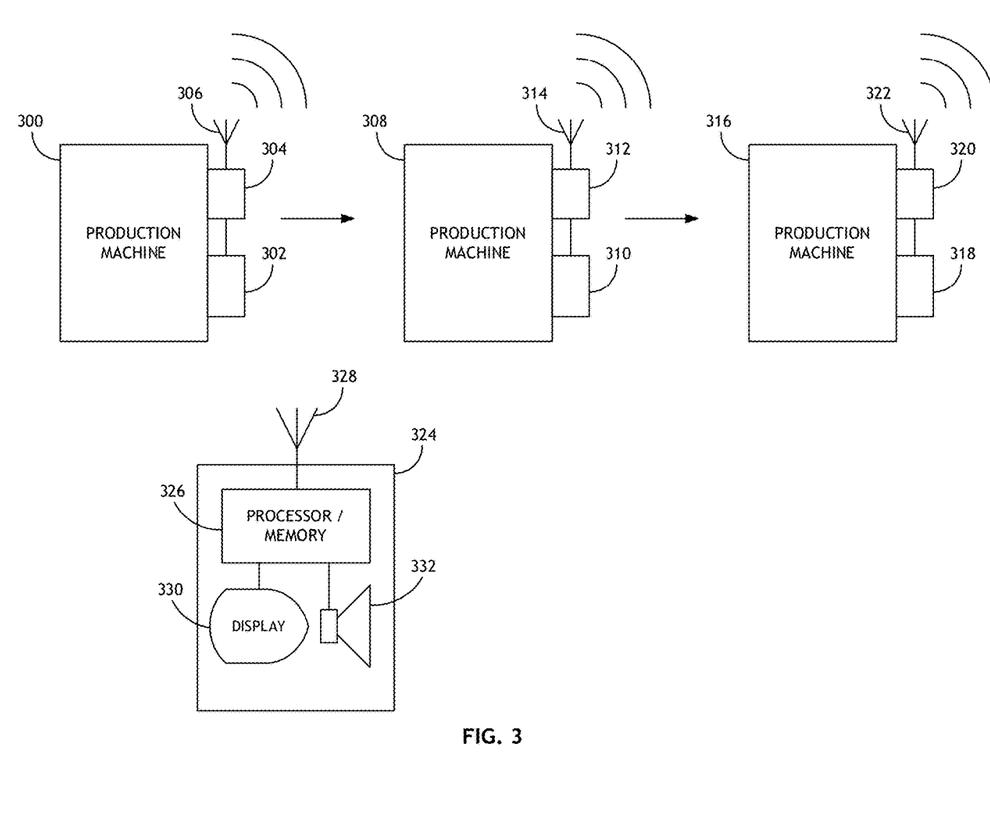
FIG. 3 shows a block diagram of machines in a production process according to embodiments of the inventive concepts disclosed herein; 3

Referring to FIG. 3, a block diagram of machines in a production process according to embodiments of the inventive concepts disclosed herein is shown. A production process may include a plurality of production machines 300, 308, 316, each performing a particular operation in the production process. Production machines 300, 308, 316 are generally controlled by an industrial controller 302, 310, 318 commonly referred to as a programmable logic controller (PLC). PLC's utilize an industrial communication port to communicate with a plurality of other devices, including, but not limited to, other PLC's, human-machine-interfaces, bar code readers, input and output devices, data collection systems, etc.

Each industrial controller 302, 310, 318 detects status or one or more faults in the corresponding production machine 300, 308, 316, and delivers status and fault data to a corresponding communication element 304, 312, 320 configured to send such status and fault data, via a transmission element 306, 314, 322, to one or more receivers 324. Each industrial controller 302, 310, 318 may communicate with a corresponding communication element 304, 312, 320 via any appropriate data communication technology including, but not limited to, Ethernet, Ethernet IP, Profibus, RS232, RS422, and ControlNet. In some embodiments, each industrial controller 302, 310, 318 exchanges register information with a corresponding communication element 304, 312, 320. In some embodiments, each communication elements 304, 312, 320 provides audio messages corresponding to the status and fault data, or some subset of the status and fault data, to one or more human operators. The one or more human operators may be divided into sets based on function or proximity. Each of the one or more receivers 324 may be associated with one set of human operators based on selected channels of communication where each communication element 304, 312, 320 is configured to deliver different sets of status and fault data to different channels of communication.

Each receiver 324 includes a processing element 326 that receives the status and fault data via a data receiving element 328 and plays audio data corresponding to the status or fault data through a speaker 332. In some embodiments, the receiver 324 may also include a display 330 for displaying additional data pertaining to the status or fault data.

When a production machine 300, 308, 316 has an issue, the corresponding industrial controller 302, 310, 318 sends a fault message to the corresponding communication element 304, 312, 320 which then relays the fault message, and in some embodiments corresponding audio data, to the one or more receivers 324 for playback to one or more human operators. This allows the human operators to address the production machine's 300, 308, 316 issues quickly and reduce downtime.

Transmission elements and corresponding receiving elements 328 may utilize any of a plurality of wireless transmission technologies, including, but not limited to, wireless RF in any range of frequencies (i.e. 2.4 Ghz, 900 Mhz, etc.), WIFI, Bluetooth, etc. Alternatively, spread spectrum frequency hopping methodology may be used to avoid interference.

In some embodiments, each industrial controller 302, 310, 318 may have access to certain data pertaining to the corresponding production machine 300, 308, 316; for example, the industrial controller 310 a second production machine 308 may track the number of articles of production, produced by a first production machine 300, still available to the second production machine 308 when the first production machine 300 fails. A corresponding second communication element 312 may use such data to determine an estimated duration until downtime begins for the second production machine 308 if the failure of the first production machine 300 is not rectified. Similar calculations could be performed for every production machine 300, 308, 316 in the production process. Alternatively, where the receiver 324 receives such status data but does not report it either audibly or visually on a regular basis, the processor 326 may perform similar downtime estimations and report them to the human operator either audibly through the speaker 332 or visually through the display element 330.

In one exemplary implementation, a first production machine 300 is connected to first communication element 304 which has been configured for a specific network address and a specific channel. A first human operator wears a first receiver 324 which has been configured with a specific unit address, network address, and channel. A second human operator wears a second receiver 324 which has been configured with a specific, different unit address, but the same specific network address and channel. The first human operator operates the first production machine 300 as needed by starting and stopping the production machine 300, clearing jams, etc. The second human operator supplies production parts to the first production machine 300 as needed. A first industrial controller 302 associated with the first production machine 300 is configured to communicate with the first communication element 304 associated with the first production machine 300. Communication between the first industrial controller 302 and the first communication element 304 comprises a minimum of two data registers: the first data register containing the unit address of the receiver 324 the message is intended to be sent to, and the second data register containing a message number to be played by the receiver 324. The first industrial controller 302 is configured to send messages to the first human operator when errors such as "Machine Jams," "Temperature errors," "air pressure errors," etc. are detected by the first industrial controller 302. The first industrial controller 302 will be programmed to send messages to the second human operator when errors such as "Out of or low on part supply" are detected by the first industrial controller 302. Each human operator only hears messages concerning their respective functions.

In another exemplary implementation, a first production machine 300 is connected to first communication element 304 which has been configured for a first network address and a specific channel, and a second production machine 308 is connected to second communication element 312 which has been configured for a second network address and a specific channel.

A first, a second, and a third human operator wear a first, a second, and a third receiver 324 respectively, which have been configured with a different unit addresses, but the same first network address, and channel. A fourth and a fifth human operator wear a fourth and a fifth receiver 324 respectively, which have been configured with a different unit addresses, but the same second network address and channel. A sixth human operator wears a sixth receiver 324 which has been configured with a specific unit address, and a group network address, and channel to receive all messages. Furthermore, a group receiver 324 connected to a loudspeaker is also configured to receive all messages from each of the production machines 300, 308.

The first, second, and third human operators will only hear messages from the first production machine 300 directed to their specific unit addresses. In some embodiments, a specific unit address may indicate receipt of all messages sent to any unit address. Likewise, the fourth and fifth operators will only hear messages from the second production machine 308 directed to their specific unit addresses, while the sixth human operator receives all messages from both the first and second production machines 300, 308.

Figure 4:
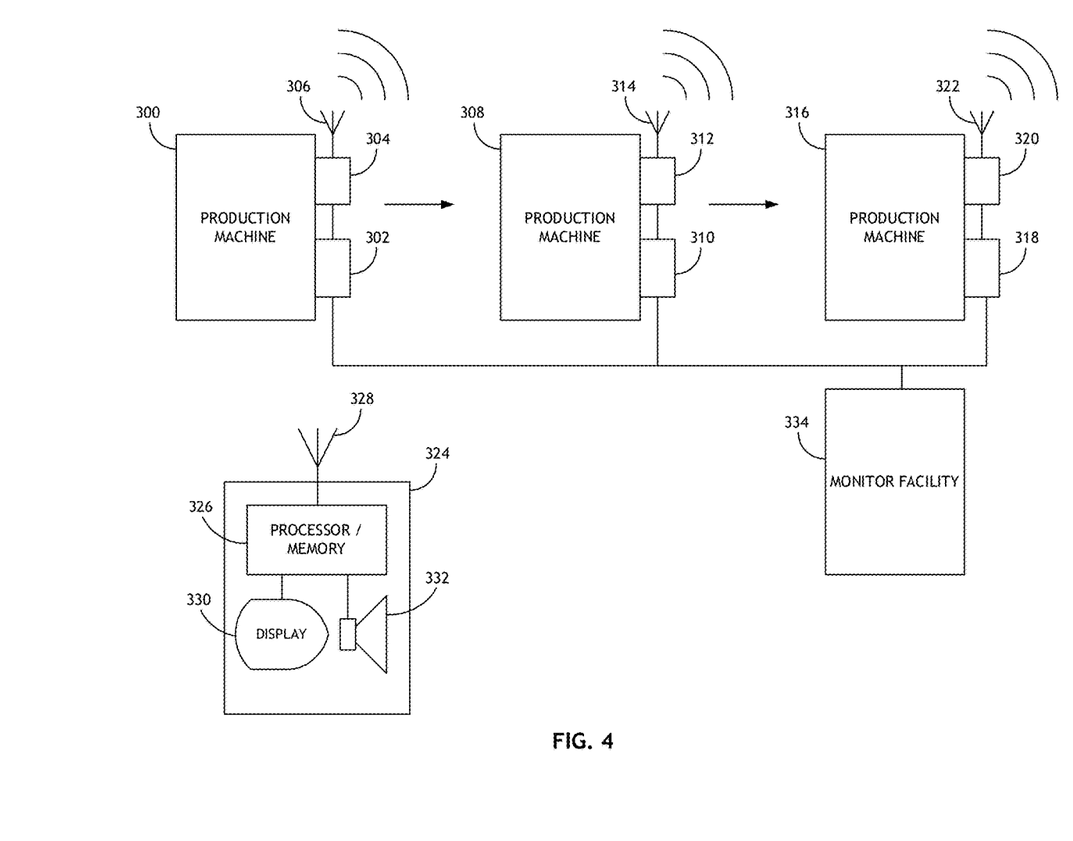
FIG. 4 shows a block diagram of machines in a production process according to embodiments of the inventive concepts disclosed herein; 4

Referring to FIG. 4, a block diagram of machines in a production process according to embodiments of the inventive concepts disclosed herein is shown. A production process may include a plurality of production machines 400, 408, 416, each performing a particular operation in the production process. Each production machine 400, 408, 416 comprises an industrial controller 402, 410, 418 for detecting the status or one or more faults in the corresponding production machine 400, 408, 416, and delivering status and fault data to a corresponding communication element 404, 412, 420 configured to send such status and fault data, via a transmission element 406, 414, 422, to a receiver 424. The industrial controllers 402, 410, 418 further send all status and fault data to centralized monitoring facility 434, which may be embodied in one or more computer servers.

The receiver 424 includes a processing element 426 that receives the status and fault data via a data receiving element 428 and plays audio data corresponding to the status or fault data through a speaker 432. In some embodiments, the receiver 424 receives status and fault data from the centralized monitoring facility 434 rather than separately from each of the individual communication elements communication elements 404, 412, 420; in such embodiment, the centralized monitoring facility 434 may perform filtering operations on the status and fault data before sending such data to the receiver 424. In some embodiments, the receiver 424 may also include a display 430 for displaying additional data pertaining to the status or fault data.

Figure 5:
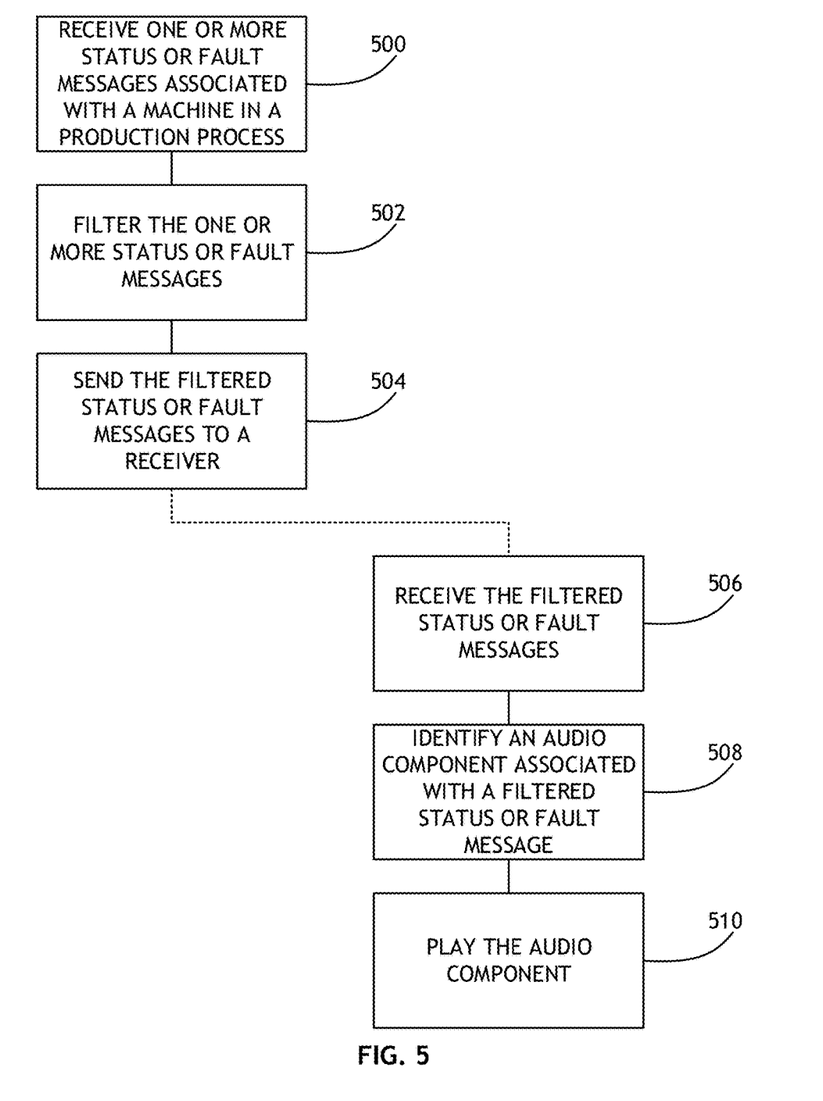
FIG. 5 shows a flowchart of an exemplary method for providing feedback of a machine in a production process to a human operator substantially in real-time according to embodiments of the inventive concepts disclosed herein; 5

Referring to FIG. 5, a flowchart of an exemplary method for providing feedback of a machine in a production process to a human operator substantially in real-time according to embodiments of the inventive concepts disclosed herein is shown. In a production process, each production machine includes a communication element that receives 500 one or more status or fault messages from internal logic in the production machine. In some embodiments, the communication element filters 502 the one or more status or fault messages based on a desired threshold of criticality, associating subsets of messages with different recipients (mechanical failures directed to maintenance channel, technical computer failures directed to a technical support channel, and non-failure status messages directed to a general channel or filtered out completely). The communication element then sends 504 the filtered status or fault messages to one or more receivers configured to receive such messages in one or more channels.

A corresponding receiver element receives 506 the filtered status or fault messages, identifies 508 an audio component associated with one of the one or more filtered status or fault messages, and plays 510 the audio component for a human operator.

Embodiments of the inventive concepts disclosed herein provide near real-time audio messages to operators, technicians, engineers, production managers, and other associates concerning the status of machines in a production process. The audio messages, at the receiver, begin to play almost instantly enabling the operator to respond such that the machine downtime is minimized. Audio messages are directed to a specific operator or a group of operators, and technicians needed to respond to specific faults. Different faults may require different individuals, potentially in different languages, to respond, eliminating messages to associates who do not need to respond Receivers can be set to one of a plurality of different channel frequencies or network addresses such that a plurality of systems can be utilized in the same area without interfering with one another.

While specific exemplary embodiments have been described relating to manufacturing equipment, other applications are envisioned. For example, in a medical environment, similar embodiments may be employed to alert various sub-sets of staff members whenever status messages pertaining to the state of a machine or patient connected to the machine are generated by the machine.

Also, while some embodiments employing wireless connectivity require a certain degree of proximity between transmitters and receivers to be operable, other embodiments may employ network connectivity such that messages may be delivered to non-local users or monitoring systems.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A system for delivering audio messages to one or more human operators in a manufacturing process comprising:

a plurality of communication elements, each associated with a production machine in the manufacturing process, and each comprising:
a transmitting processor;
memory connected to the transmitting processor;
an industrial controller connection element connected to the transmitting processor; and
a transmitter connected to the transmitting processor,
wherein the transmitting processor is configured to:
   receive a fault code via the industrial controller connection;
   identify at least one receiver associated with the fault code by filtering fault codes based on an identity of the production machine to identify a first set of receivers and filtering fault codes based on a nature of a system failure to identify a second set of receivers, the at least one receiver being in the first set and the second set; and
   transmit a signal to the identified at least one receiver via the transmitter, the signal comprising an indication of the fault code; and
   one or more receivers, each comprising:
a receiving processor;
memory connected to the receiving processor;
a data storage element connected to the receiving processor, the data storage element storing an audio representation for each of a plurality of fault codes associated with potential faults from the corresponding production machine in a plurality of languages;
a speaker connected to the receiving processor; and
a data reception element connected to the receiving processor,
wherein the receiving processor is configured to:
   receive the signal comprising the fault code;
   identify a desired language from the plurality of languages; and
   play the audio representation of the fault code via the speaker in the desired language.

2. The system of claim 1, wherein each of the plurality of communication elements further comprises a data storage element connected to the transmitting processor, the data storage element storing an audio representation for each of a plurality of fault codes associated with potential faults from the corresponding production machine.

3. The system of claim 2, wherein the stored audio representations comprise multiple language versions of each of the plurality of fault codes.

4. The system of claim 3, wherein:
the transmitting processor is further configured to:
   identify a first desired language associated with the at least one receiver;
   identify a second language associated with at least one alternate receiver in the one or more receivers; and
   transmit a signal to the alternate receiver indicating the fault code and the second language; and
the one or more receivers comprises at least one receiver configured to play audio representations in the first desired language and at least one receiver configured to play audio representations in the second desired language.

5. The system of claim 1, wherein at least one receiver is configured to play audio representations in a first desired language and at least one receiver is configured to play audio representations in a second desired language.

6. The system of claim 1, wherein identifying at least one receiver associated with the fault code comprises:
filtering fault codes based on a nature of a system failure; and
identifying a receiver associated with the nature of the system failure.

7. The apparatus of claim 1, further comprising a display element connected to the receiving processor, wherein the receiving processor is further configured to display a textual version of the fault code on the display element.

* * * * *